J. P. DELANEY.
GAS MEASURING INSTRUMENT.
APPLICATION FILED DEC. 29, 1911.
1,096,228.
Patented May 12, 1914.
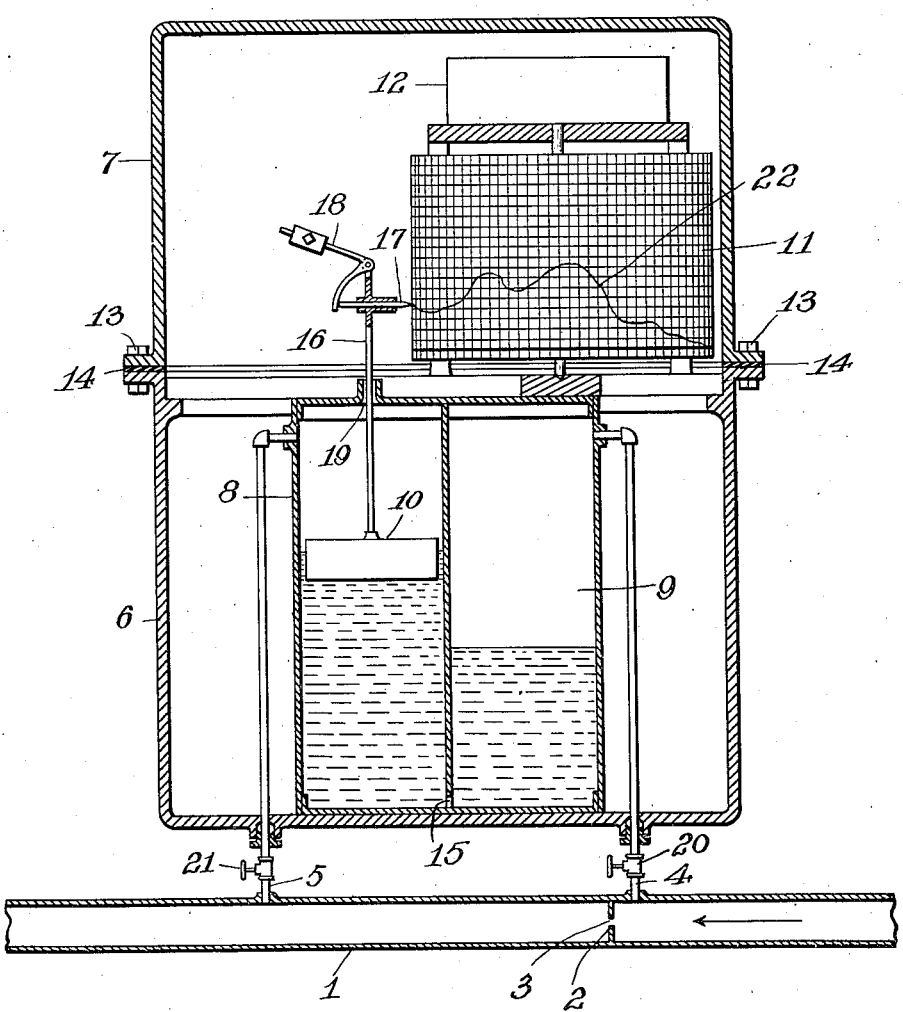
WITNESSES:
INVENTOR

UNITED STATES PATENT OFFICE.

JOSEPH P. DELANEY, OF PITTSBURGH, PENNSYLVANIA, ASSIGNOR TO MUNICIPAL SUPPLIES COMPANY, OF PITTSBURGH, PENNSYLVANIA.

GAS-MEASURING INSTRUMENT.

1,096,228. Specification of Letters Patent. Patented May 12, 1914.

Application filed December 29, 1911. Serial No. 668,405.

*To all whom it may concern:*

Be it known that I, JOSEPH P. DELANEY, residing at Pittsburgh, in the county of Allegheny and State of Pennsylvania, a citizen of the United States, have invented or discovered certain new and useful Improvements in Gas-Measuring Instruments, of which improvement the following is a specification.

My invention relates to the measurement of gas, and the object of my invention is to provide means whereby the volume of flowing gas may be accurately determined.

In the accompanying drawing, which forms part of my specification, and which illustrates my invention in its preferred form, I have shown a transverse sectional view of a differential pressure recorder in connection with a gas pipe.

In the practice of my invention I place, in a gas pipe 1, an abutment 2, provided with an orifice 3, of known cross-sectional area; and I connect a pipe 4 to one side and a pipe 5 to the other side of the said orificed abutment, the openings of the said pipes 4 and 5 preferably being in a plane parallel with the flow of gas in the pipe, as shown in the drawing, so that the gas within each of the said pipes 4 and 5 will be of the same statical pressure, respectively, as the gas on the left and right sides of the abutment. The other ends of the said pipes 4 and 5 are connected to a suitable pressure gage, as will hereinafter be more fully explained.

When gas flows through the pipe 1, as for example in the direction indicated by the arrow placed therein, the static gas pressure to the right of the abutment 2 will be greater than that on the opposite side of the said abutment, and the greater the difference in the said pressure the greater will be the flow through the orifice 3. Therefore, by connecting the up-stream end of the pipe 1 to a source of gas supply and the down-stream end to a consumer's pipe, the quantity of gas flowing through the pipe 1 may be ascertained by recording the difference in its static pressure above and below the said abutment.

The recording instrument which I preferably employ is illustrated in the accompanying drawing, and consists of a box or casing 6, 7, a two part fluid chamber 8, 9 having a float 10 in one chamber, and an indicator sheet 11, operated by a clock-work 12. The said casing preferably consists of two parts, a bottom portion 6 and a cover 7, suitably united by bolts 13 through an interposed gasket 14, forming a gas-tight joint. The fluid chamber 9 may be connected to the pipe 4, and the pipe 5 may be likewise connected to the chamber 8, there being a suitable communication port 15 between the two said chambers, which are preferably of the same size. A non-vaporizable liquid, such as oil or mercury, may be placed in the said fluid chambers, the particular fluid employed being determined by the conditions of service. The float 10 may be of any desired construction and may be provided with a stem 16, having at its opposite end a suitable recording pencil 17. The stem 16 may be non-circular in cross-section, and the opening through which said stem passes of similar form, to thereby prevent rotation of the stem about its axis. To the end that the said pencil may be held yieldingly in engagement with the indicator sheet 11, a weighted bell-crank lever 18 may be pivoted to the said stem as shown. The indicator sheet 11 is preferably secured to a cylindrical body which may be rotated uniformly by the clock-work 12.

The opening 19, through which the stem 16 passes, is preferably of such diameter as to permit the said stem to move freely therethrough, and at the same time form a guide for the said stem; and there is preferably no packing on the inner wall of the said opening. It will be understood of this particular feature of my construction that gas from the chamber 8 will escape through the opening. The stem and opening may be angular in cross-section to prevent rotation of the stem 19 into the casing 6, 7. It is in view of this feature of my construction that I have provided a gas-tight casing. To the end that gas, other than that confined in the casing 6, 7, will not escape when the cover 7 is removed, I provide the pipes 4, and 5 with valves 20 and 21, which may be closed before the said cover is removed.

In the operation of my pressure-recorder, the static pressure of the gas to the right of the abutment 2 (when gas is flowing through the orifice 3) being greater than the static pressure to the left of the said abutment, the fluid in the chamber 9 will be at a lower level than that in the chamber 8, the difference in level being proportional to the difference in the static gas-pressures on each side of the said abutment. The float 10 will rise in the chamber 8 to an elevation determined by the relative levels of the fluid in the said chamber, and, as the float rises, the pencil 17 will record, on the uniformly moving indicator-sheet 11, the variations in gas pressure. When there is no gas flowing through the orifice 3 there will be no difference in the pressure of the gas above and below the abutment, and the pencil 17 will then move along the zero line of the indicator-sheet; but, when the consumer starts using gas the pressure to the left of the abutment will decrease and cause, as heretofore explained, the pencil to move upward and to record, as by the line 22 the difference in pressure. The sheet 11 may be removed at desired intervals, and the record may be used to determine the quantity of gas consumed.

It will be observed of my invention that the quantity of gas consumed may be ascertained independently of the relatively uncertain movements of a mechanical meter. Furthermore it will be observed that my recording instrument will respond accurately to the slightest variation in the pressure, there being no mechanical movements and no packed joints to retard, or hinder in any way, the movement of the recording members.

I do not wish to limit myself to the details of construction shown and described herein, for obviously many changes may be made by those skilled in the art without departing from the spirit of my invention.

I claim as my invention:

1. A pressure recorder for gas, comprising a fluid receptacle having two vertically extending chambers side by side and connected at their lower portions, said chambers being arranged to contain two communicating columns of liquid, pressure connections arranged respectively to lead gaseous pressure into the upper portion of the two chambers above the liquid columns therein, one of said chambers being closed except for the said pressure connection and the other having an opening at its upper end, a float adapted to be supported on the liquid column in the last named chamber, a gas tight chamber into which said opening leads, a recording device in said chamber having a coöperating pencil and chart, and a connection leading from the float upwardly through said opening and actuating one member of the recording device; substantially as described.

2. A pressure recorder for gas, comprising a fluid receptacle having two vertically extending chambers side by side and connected at their lower portions, said chambers being arranged to contain two communicating columns of liquid, pressure connections arranged respectively to lead gaseous pressure into the upper portion of the two chambers above the liquid columns therein, one of said chambers being closed except for the said pressure connection and the other having an opening at its upper end, a float adapted to be supported on the liquid column in the last named chamber, a gas tight chamber into which said opening leads, a recording device in said chamber having a coöperating pencil and chart, and a connection leading from the float upwardly through said opening and directly carrying the pencil of the recording device; substantially as described.

In testimony whereof I have hereunto set my hand.

JOSEPH P. DELANEY.

Witnesses:
PAUL N. CRITCHLOW,
HARRY M. McCABE.